United States Patent
Miyamoto

(10) Patent No.: US 7,606,389 B2
(45) Date of Patent: Oct. 20, 2009

(54) DIGITAL WATERMARKING APPARATUS AND COMPUTER-READABLE MEDIUM

(75) Inventor: Takashi Miyamoto, Saitama (JP)

(73) Assignee: Fujifilm Corporation, Tokyo (JP)

( * ) Notice: Subject to any disclaimer, the term of this patent is extended or adjusted under 35 U.S.C. 154(b) by 660 days.

(21) Appl. No.: 11/064,457

(22) Filed: Feb. 24, 2005

(65) Prior Publication Data
US 2005/0190950 A1    Sep. 1, 2005

(30) Foreign Application Priority Data
Feb. 26, 2004   (JP)  .......................... P2004-051107

(51) Int. Cl.
*G06K 9/00* (2006.01)
*H04L 9/32* (2006.01)

(52) U.S. Cl. .................. 382/100; 382/165; 713/176
(58) Field of Classification Search ................ 382/100, 382/106, 112–113, 135–139, 155, 162, 163, 382/167, 168, 181, 182, 203, 190–194, 232, 382/236, 254, 274, 276, 286, 290, 305, 312; 345/505, 582; 101/483; 380/54; 713/176
See application file for complete search history.

(56) References Cited

U.S. PATENT DOCUMENTS

| | | | | |
|---|---|---|---|---|
| 5,774,133 A | * | 6/1998 | Neave et al. ................ | 345/505 |
| 5,875,249 A | * | 2/1999 | Mintzer et al. ............... | 380/54 |
| 6,901,862 B2 | * | 6/2005 | Yamaguchi et al. ......... | 101/483 |
| 7,113,612 B2 | * | 9/2006 | Sugahara et al. ............ | 382/100 |
| 7,197,162 B2 | * | 3/2007 | Murakami ................... | 382/100 |
| 7,239,325 B2 | * | 7/2007 | Sasaki et al. ................ | 345/582 |
| 7,308,110 B2 | * | 12/2007 | Rhoads ....................... | 382/100 |
| 7,386,729 B2 | * | 6/2008 | Lee et al. .................... | 713/176 |

FOREIGN PATENT DOCUMENTS

| | | |
|---|---|---|
| JP | 11-164129 | 6/1999 |
| JP | 2004-88565 | 3/2004 |

OTHER PUBLICATIONS

Japanese Office Action dated Nov. 27, 2007 with English Translation.

* cited by examiner

*Primary Examiner*—Seyed Azarian
(74) *Attorney, Agent, or Firm*—McGinn IP Law Group, PLLC

(57) ABSTRACT

A digital watermarking apparatus for embedding a data in an index color image data, wherein the data is configured by an arrangement of a first data and a second data, and the apparatus has: an allocating unit for allocating the data to values of positions of a color lookup table included in the index color image data; and an adjusting unit for adjusting a value of the color lookup table to which the first data is allocated, to an odd number, and adjusting a value of the color lookup table to which the second data is allocated, to an even number.

16 Claims, 5 Drawing Sheets

DIGITAL WATERMARKING APPARATUS AND COMPUTER-READABLE MEDIUM

This application is based on Japanese Patent application JP 2004-051107, filed Feb. 26, 2004, the entire content of which is hereby incorporated by reference. This claim for priority benefit is being filed concurrently with the filing of this application.

BACKGROUND OF THE INVENTION

1. Technical Field of the Invention

The present invention relates to a digital watermarking apparatus and a computer-readable medium for embedding a data in an index color image data.

2. Background of the Related Art

Recently, digital watermarking is used for the sake of giving copyright protection to an image, or the like. Practically, contents on which digital watermarking is to be applied are restricted to those in which the number of colors is large, such as full-color ones. There has been no technique for embedding a data in an image which can be expressed only by a relative small number of colors or 256 or less colors (for example, an 8-bit index color image). This is caused because only full-color images have been considered as contents which are to be subjected to copyright protection. It has been considered that digital watermarking is not needed in an image which can be expressed only by 256 or less colors. Moreover, there is a technical problem in that, in an image which can be expressed only by 256 or less colors, the range where the pixel color can be changed is restricted and hence digital watermarking is not suitable for information hiding.

A conventional example of digital watermarking is disclosed in JP-A-11-164129. The reference discloses a technique in which a data is embedded in a frequency region of an image data.

However, there is a need of embedding information in an image which can be expressed only by 256 or less colors. For example, a system will be considered in which an image data is uploaded from a cell phone to a server, and the image data is downloaded by another cell phone, thereby enabling the image data to be shared by plural persons. In such a system, it may be requested to know the number of situations where the image data which has been once downloaded is again uploaded to the server. In this case, the number of uploading operations may be embedded in the image data. If all cell phones can display an image of 256 or more colors, there arises no problem. In the case of a cell phone which can display only an image of 256 or less colors, such as GIF, it is impossible to check an image data which is uploaded from the cell phone. The above-mentioned need exists in such a system. The invention has been conducted in view of the above-discussed circumstances.

SUMMARY OF THE INVENTION

It is an object of the invention to provide a digital watermarking apparatus which can embed a data in an index color image data, and also a digital watermarking apparatus which can restore a data embedded in an index color image data.

The digital watermarking apparatus of the invention is a digital watermarking apparatus for embedding a data in an index color image data, wherein the data is configured by an arrangement of a first data and a second data, and the apparatus comprises: an allocating unit for allocating the data to values of predetermined positions of a color lookup table included in the index color image data; and an adjusting unit for adjusting a value of the color lookup table to which the first data is allocated, to an odd number, and adjusting a value of the color lookup table to which the second data is allocated, to an even number.

Preferably, in the digital watermarking apparatus of the invention, the allocating unit allocates the data to values of one of three primary colors of the color lookup table.

Still preferably, in the digital watermarking apparatus of the invention, the allocating unit allocates the data to values of at least two of three primary colors of the color lookup table.

According to the configuration, a data can be embedded in an index color image data.

Preferably, in the digital watermarking apparatus of the invention, the allocating unit conducts the allocation after the arrangement of the first data and the second data is rearranged in accordance with a predetermined rule.

According to the configuration, it is possible to enhance the security of a data which is to be embedded in an index color image data.

Preferably, in the digital watermarking apparatus of the invention, the allocating unit conducts the allocation of data, while restricting an allocation object to only values of medium colors among values of three primary colors of the color lookup table.

According to the configuration, it is possible to prevent a large change from occurring in an image based on an index color image data.

In addition, in the digital watermarking apparatus of the invention, the apparatus preferably further comprises table adding unit for adding a new color lookup table to the color lookup table.

According to the configuration, it is possible to increase the amount of data to be embedded in an index color image data.

The digital watermarking apparatus of the invention is a digital watermarking apparatus for restoring a data embedded in an index color image data, wherein the apparatus comprises: a reading unit for reading out values of predetermined positions of a color lookup table included in the index color image data; a determining unit for determining whether the readout values are odd or even; a first restoring unit for restoring a first data from a value which is determined to be odd, and restoring a second data from a value which is determined to be even; and a second restoring unit for restoring the data with arranging the restored first and second data.

Preferably, in the digital watermarking apparatus of the invention, the reading unit reads out values of one of three primary colors of the color lookup table.

Still preferably, in the digital watermarking apparatus of the invention, the reading unit reads out values of at least two of three primary colors of the color lookup table.

According to the configuration, it is possible to restore a data embedded in an index color image data.

Preferably, in the digital watermarking apparatus of the invention, the second restoring unit rearranges an arrangement of the first data and the second data in accordance with a predetermined rule to restore the data.

According to the present invention, there is provided a computer-readable medium comprising a set of instructions for achieving the digital watermarking apparatus of the present invention. The digital watermarking apparatus can be embodied by installing a program corresponding to the set of instructions.

According to the invention, a digital watermarking apparatus which can embed a data in an index color image data, and also a digital watermarking apparatus which can restore a data embedded in an index color image data can be provided.

DETAILED DESCRIPTION OF THE INVENTION

Figure 1:
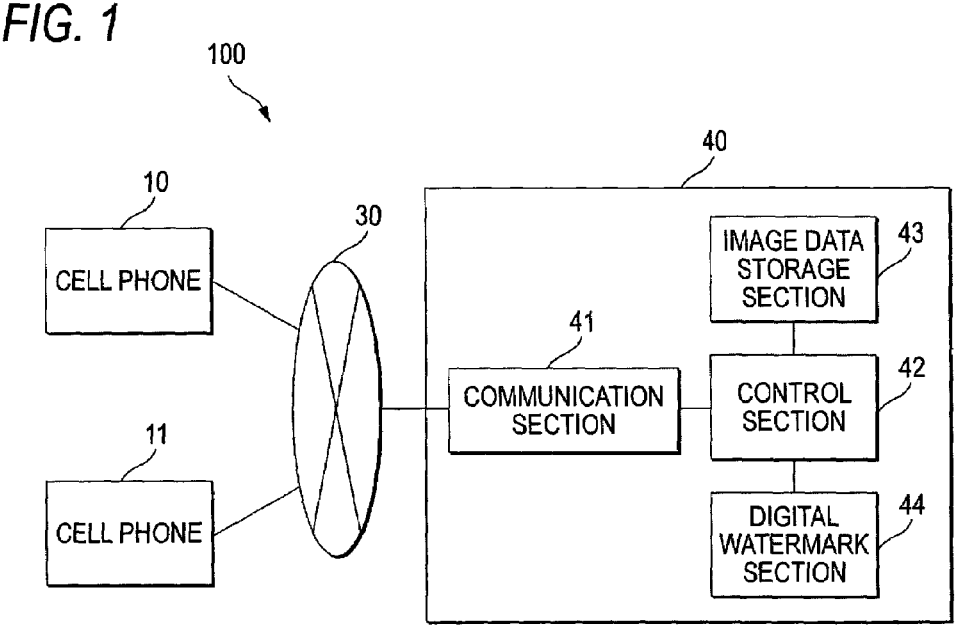
FIG. 1 is a diagram schematically showing the configuration of an image-sharing system illustrating an embodiment of the invention.

FIG. 1 is a diagram schematically showing the configuration of an image-sharing system illustrating an embodiment of the invention.

The image-sharing system 100 of FIG. 1 comprises a plurality of cell phones 10, 11, a network 30 such as the Internet, and an image management server 40. The cell phones 10, 11 and the image management server 40 are connected to the network 30.

In the cell phone 10, only an index color image based on an index color image data typified by an image data of the GIF format or the PNG format of 256 colors can be displayed, and an imager other than such an index color image, such as a JPEG image cannot be displayed. In the cell phone 11, such an index color image and a JPEG image can be displayed.

The image management server 40 comprises a communication section 41, a control section 42, an image data storage section 43, and a digital watermark section 44.

The communication section 41 communicates with the cell phones 10, 11 via the network 30.

The control section 42 controls the whole image management server 40.

The image data storage section 43 stores image data including index color image data which are transmitted (uploaded) from the cell phones 10, 11.

The digital watermark section 44 embeds a data in an image data. The data to be embedded indicates how many times the image data has been uploaded to the image management server 40. The digital watermark section 44 restores a data embedded in an image data. The digital watermark section 44 is mainly configured by a processor which operates by implementing a digital watermarking program.

Hereinafter, the operation of the image-sharing system 100 will be described.

When an image data is transmitted (uploaded) from the cell phone 10 to the image management server 40, the image management server 40 receives the image data via the communication section 41. The digital watermark section 44 embeds a data (a data indicating one uploading operation) in the image data, and the image data in which the data has been embedded is stored into the image data storage section 43. When a request for delivering a stored image data is sent from the cell phone 11, the image data is transmitted to the cell phone 11 via the communication section 41. In the image management server 40, the data which is embedded in the image data stored in the image data storage section 43 is restored by the digital watermark section 44, and the use situation of the image data is managed on the basis of the restored data.

For an image data other than an index color image data, the digital watermark section 44 embeds a data in the image data by a conventional method such as that disclosed in JP-A-11-164129. For an index color image data, the digital watermarking section 44 embeds a data in the image data by methods described the following first and second embodiments, and restores the embedded data.

First Embodiment

Figure 2:
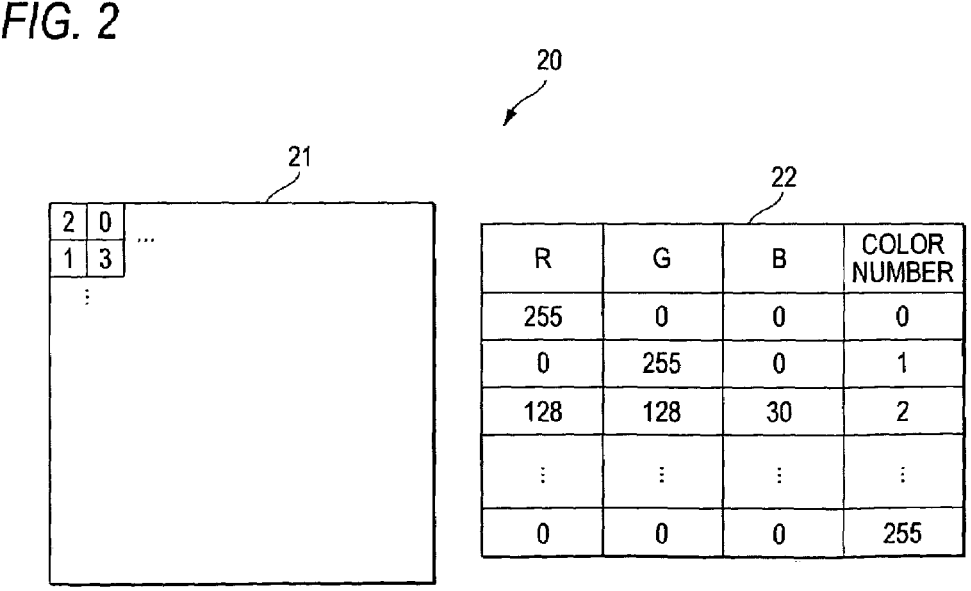
FIG. 2 is a view illustrating an index color image data.

First, an index color image data will be described. An index color image data is used as a data of a format such as GIF, PNG, or BMP. FIG. 2 is a view illustrating an index color image data.

An index color image data 20 comprises: an index color image data body 21 configured by a plurality of pixel data respectively corresponding to pixels of an index color image (the pixel data are provided with color numbers, respectively); and a color lookup table 22 which is a table showing correspondence relationships between the color numbers and the values of the three primary colors RGB (R: red, G: green, B: blue). In the embodiment, the number of colors in an index color image data is set to 256 colors.

A data which is to be embedded in the index color image data 20 by the digital watermark section 44 is configured by an arrangement of a first data and a second data, such as a numerical sequence of "1" and "0". The following description is made assuming that the data to be embedded is a data of "100 . . . 0110" in which a 256 number of "1" and "0" are arranged.

Next, the operation of the digital watermark section 44 in the case where a data is embedded in an index color image data will be described.

Figure 3:
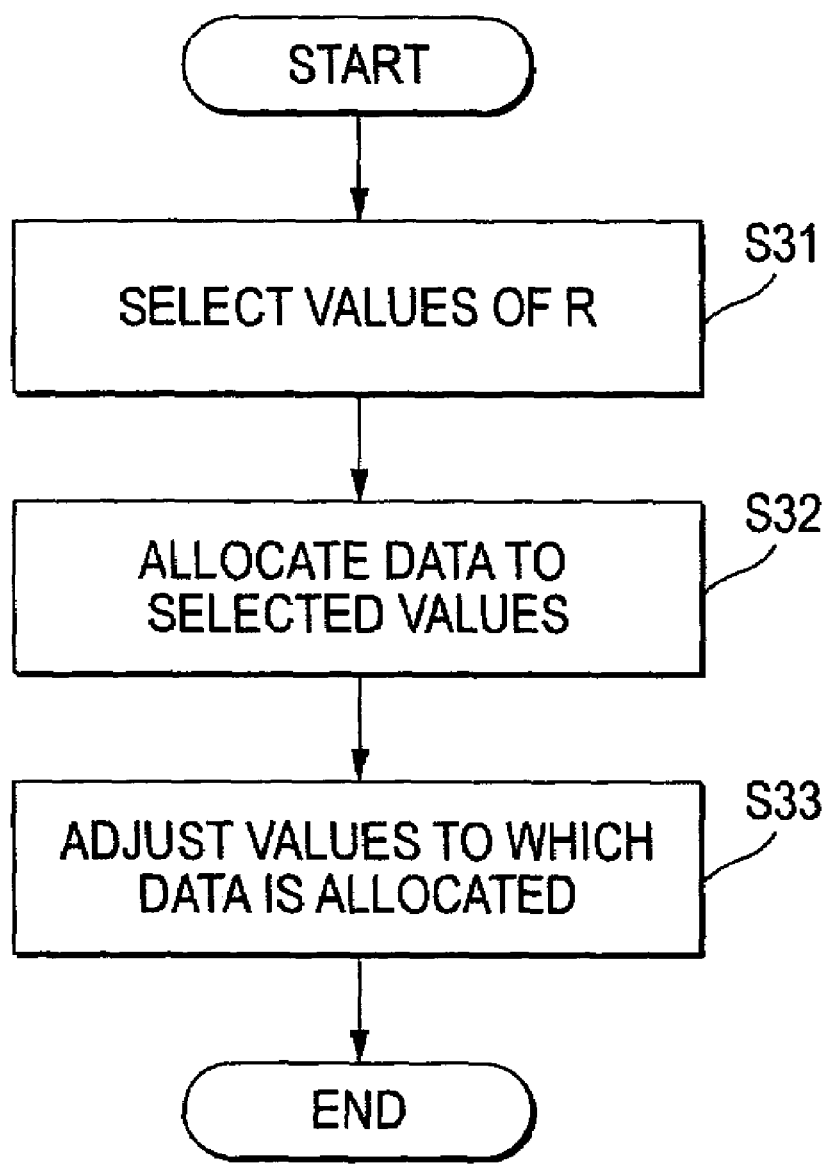
FIG. 3 is a chart showing the flow of a data embedding operation of a digital watermarking apparatus illustrating a first embodiment of the invention.

FIG. 3 is a chart showing the flow of the data embedding operation of a digital watermarking apparatus illustrating the first embodiment of the invention.

The digital watermark section 44 selects values of predetermined positions from the values of the color lookup table 22 of the index color image data 20. For example, all the values of red (R) are selected as the values of predetermined positions (S31). The digital watermark section 44 allocates the above-mentioned data to the selected values in accordance with a predetermined allocation rule (a rule defining a relationship between a numeric value of a data and a position where the numeric value is to be allocated to the value of the position) (S32). For example, the first value of the data is allocated to the value of R of color number 0 in the color lookup table 22, and the next value of the data is allocated to the value of R of color number 1 in the color lookup table 22. In this way, one numeric value "0" or "1" is allocated to one value of the color lookup table 22.

The digital watermark section 44 conducts adjustments so that, in the color lookup table 22, a value to which the numeric value "0" is allocated is an even number, and that to which the numeric value "1" is allocated is an odd number (S33). When a value to which the numeric value "0" is allocated is 253, for example, the value is incremented or decremented by one to be changed to 254 or 252. When a value to which the numeric value "0" is allocated is 254, the value is unchanged. When a value to which the numeric value "1" is allocated is 254, the value is incremented or decremented by one to be changed to 255 or 253. When a value to which the numeric value "1" is allocated is 253, the value is unchanged. When this adjustment is ended, the data embedding process is completed.

As a result of the adjustment, "0" is embedded in even values, and "1" is embedded in odd values of R in the color lookup table 22.

Next, the operation of the digital watermark section 44 in the case where the data embedded in the index color image data is restored will be described.

Figures 4, 5:
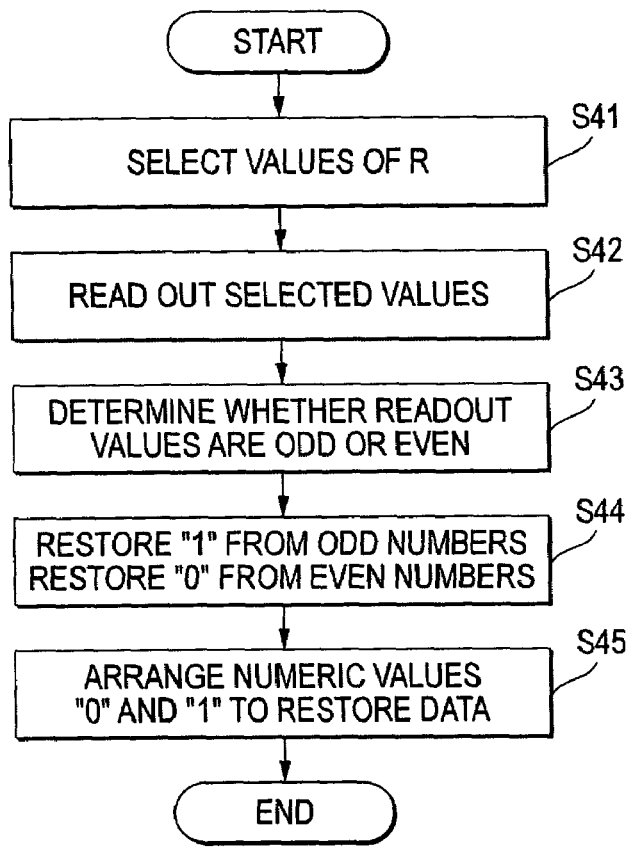
FIG. 4 is a chart showing the flow of a data restoring operation of the digital watermarking apparatus illustrating the first embodiment of the invention.
FIG. 5 is a view showing the data restoring operation of the digital watermarking apparatus illustrating the first embodiment of the invention.

FIG. 4 is a chart showing the flow of the data restoring operation of the digital watermarking apparatus illustrating the first embodiment of the invention.

The digital watermark section 44 selects values of the above-mentioned predetermined positions from the values of the color lookup table 22 of the index color image data 20 (S41), and reads out the selected values (S42). The digital watermark section 44 determines whether the readout values are odd or even (S43), and restores the numeric value "1" from values which are determined to be odd, and the numeric value "0" from values which are determined to be even (S44). As a result, as shown in FIG. 5, the numeric value "1" or "0" is restored from each of the values of R in the color lookup table 22. At this time, since the numeric values "1" and "0" are not arranged, the data cannot be restored. Therefore, the digital watermark section 44 arranges the restored numeric values "1" and "0" in accordance with the predetermined allocation rule, thereby restoring the data (S45).

In this way, the digital watermark section 44 can embed a data as a digital watermark in an index color image data, and restore the embedded data.

In the allocation of a data by the digital watermark section 44 in S32 of FIG. 3, alternatively, the allocation may be conducted after numeric values "1" and "0" contained in the data are rearranged in accordance with a predetermined rule. In the alternative, in S45 of FIG. 4, the arrangement of the restored numeric values "1" and "0" may be returned to the original arrangement in accordance with the predetermined rule, whereby the data can be restored. According to the configuration, even an arrangement of numeric values "1" and "0" can be restored, the resulting arrangement has a sequence which is obtained by rearranging the arrangement of the embedded data, and hence it is impossible to restore the data. Therefore, the security of a data can be ensured.

In S31 of FIG. 3, the digital watermark section 44 selects all the values of R. Alternatively, the section may select all the values of green (G), or all the values of blue (B). Alternatively, in place of the selection in which all the values of one color are selected, values the number of which corresponds to the number of "0" and "1" constituting the data may be selected.

Alternatively, the digital watermark section 44 may select in S31 of FIG. 3 all the values of R, all the values of G, and all the values of B, and allocate one data to all the values of R, another data to all the values of G, and a further value to all the values of B. In the alternative, the digital watermark section 44 restores three data from the values of the colors of RGB. According to the configuration, the amount of a data to be embedded in an index color image data can be triplicated. Alternatively, a data may be allocated to the values of two colors of the three colors of RGB, and the data may be then restored. In this case, the amount of data to be embedded in an index color image data can be doubled.

When the digital watermark section 44 selects in S31 of FIG. 3 the values of R, preferably, the object to be selected may be restricted to the values of R excluding 0 (i.e., the values (1 to 255) of medium colors) because of the following reason. In the case where the value of R is 0, when the numerical value "1" is allocated to the value, it is required to change the value of R from 0 to 1, thereby causing a problem in that the color change is conspicuous.

In the above, the description has been conducted with using an index color image data of 256 colors as an example. In the case of an index color image data of 256 or less colors, the number of values of the color lookup table 22 is reduced. In this case, when a large amount of data is to be embedded in the index color image data, there is a possibility that the data cannot be embedded in the color lookup table 22. In such a case, therefore, the digital watermark section 44 may add a new color lookup table in which appropriate values are set, to the color lookup table 22, thereby increasing the data amount of the color lookup table 22. According to the configuration, even in the case where the number of colors of an index color image data is small, it is possible to embed necessary data.

Second Embodiment

An embodiment which is a modification of the process in the digital watermark section 44 will be described.

Figures 6, 7:
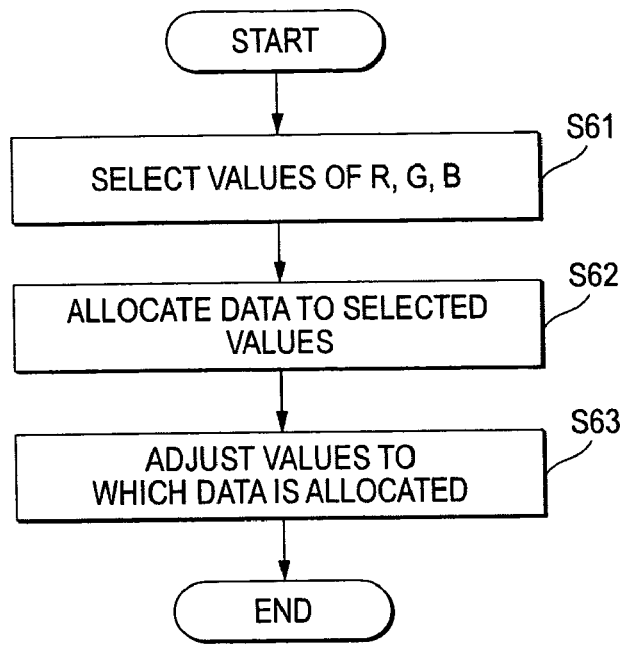
FIG. 6 is a chart showing the flow of a data embedding operation of a digital watermarking apparatus illustrating a second embodiment of the invention.
FIG. 7 is a view showing the operation of the digital watermarking apparatus illustrating the second embodiment of the invention.

FIG. 6 is a chart showing the flow of the data embedding operation of a digital watermarking apparatus illustrating the second embodiment of the invention.

The digital watermark section 44 selects values of predetermined positions from the values of the color lookup table 22 of the index color image data 20. As shown in FIG. 7, for example, values of positions (the portions enclosed by the thick grid lines) which are randomly determined from values of RGB are selected as the values of predetermined positions (S61). The digital watermark section 44 allocates the data to the selected values in accordance with a predetermined allocation rule (a rule defining a relationship between a numeric value of a data and a position where the numeric value is to be allocated to the value of the position) (S62). For example, the first value of the data is allocated to the value of B of color number 0 in the color lookup table 22, and the next value of the data is allocated to the value of G of color number 1 in the color lookup table 22. In this way, the numerical values of the data are allocated with starting from the first numerical value to the values of the colors respectively having selected values in the ascending order of color number. As a result, one numeric value "0" or "1" is allocated to a selected value of the color lookup table 22.

The digital watermark section 44 conducts adjustment so that, in the color lookup table 22, a value to which the numeric value "0" is allocated is an even number, and that to which the numeric value "1" is allocated is an odd number (S63). Then, the data embedding process is completed.

As a result of the adjustment, "0" is embedded in even values out of the values of predetermined positions in the color lookup table 22, and "1" is embedded in odd values.

Next, the operation of the digital watermark section 44 in the case where the data embedded in the index color image data is restored will be described.

Figure 8:
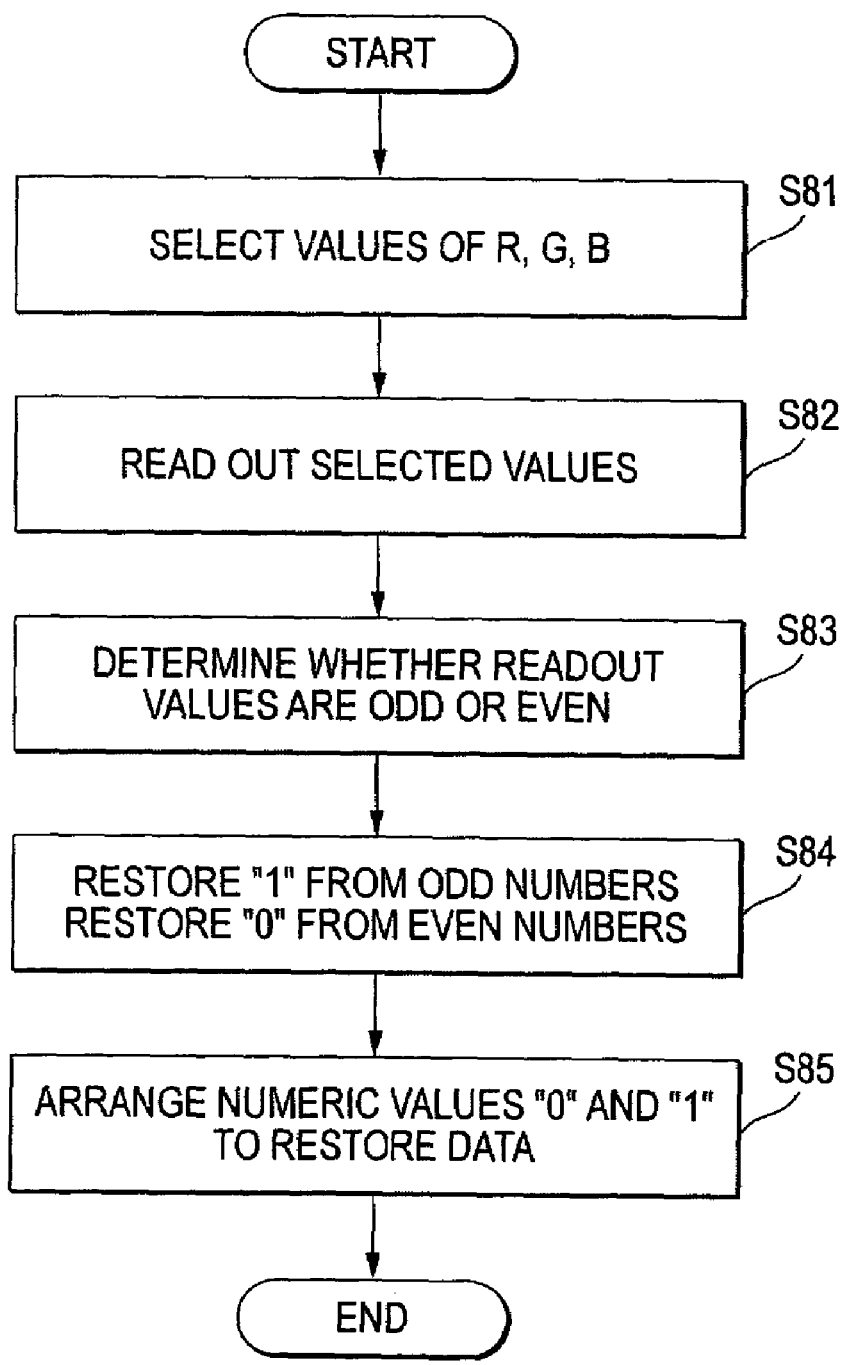
FIG. 8 is a chart showing the flow of the data restoring operation of the digital watermarking apparatus illustrating the second embodiment of the invention.

FIG. 8 is a chart showing the flow of the data restoring operation of the digital watermarking apparatus illustrating the second embodiment of the invention.

The digital watermark section 44 selects values of the above-mentioned predetermined positions from the values of the color lookup table 22 of the index color image data 20 (S81), and reads out the selected values (S82). The digital watermark section 44 determines whether the readout values are odd or even (S83), and restores the numeric value "1" from values which are determined to be odd, and the numeric value "0" from values which are determined to be even (S84). As a result, as shown in FIG. 7, the numeric value "1" or "0" is restored from each of the values of the predetermined positions in the color lookup table 22. At this time, since the numeric values "1" and "0" are not arranged, the data cannot be restored. Therefore, the digital watermark section 44 arranges the restored numeric values "1" and "0" in accordance with the predetermined allocation rule, thereby restoring the data (S85).

In this way, the digital watermark section 44 can embed a data as a digital watermark in an index color image data, and restore the embedded data.

In the allocation of a data by the digital watermark section 44 in S62 of FIG. 6, alternatively, the allocation may be conducted after numeric values "1" and "0" contained in the data are rearranged in accordance with a predetermined rule. In the alternative, in S85 of FIG. 8, the arrangement of the restored numeric values "1" and "0" may be returned to the original arrangement in accordance with the predetermined rule, whereby the data can be restored. According to the configuration, even an arrangement of numeric values "1" and "0" can be restored, the resulting arrangement has a sequence which is obtained by rearranging the arrangement of the embedded data, and hence it is impossible to restore the data. Therefore, the security of a data can be ensured.

In S61 of FIG. 6, the digital watermark section 44 may select values the number of which corresponds to the number of "0" and "1" constituting the data.

When the digital watermark section 44 selects in S61 of FIG. 6 the values of RGB, preferably, the section selects the values of RGB excluding 0 (i.e., the values (1 to 255) of medium colors) because of the following reason. In the case where the values of RGB are 0, when the numerical value "1" is allocated to the values, it is required to change the values of RGB from 0 to 1, thereby causing a problem in that the color change is conspicuous.

In the above, the description has been conducted with using an index color image data of 256 colors as an example. In the case of an index color image data of 256 or less colors, the number of values of the color lookup table 22 is reduced. In this case, when a large amount of data is to be embedded in the index color image data, there is a possibility that the data cannot be embedded in the color lookup table 22. In such a case, therefore, the digital watermark section 44 may add a new color lookup table in which appropriate values are set, to the color lookup table 22, thereby increasing the data amount of the color lookup table 22. According to the configuration, even in the case where the number of colors of an index color image data is small, it is possible to embed a large amount of data.

What is claimed is:

1. A digital watermarking apparatus for embedding a data in an index color image data, wherein
    the data is configured by an arrangement of a first data and a second data, and
    the apparatus comprises:
    an allocating unit for allocating the data to values of positions of a color lookup table included in the index color image data; and
    an adjusting unit for adjusting a value of the color lookup table to which the first data is allocated, to an odd number, and adjusting a value of the color lookup table to which the second data is allocated, to an even number;
    wherein the allocating unit allocates the data after arranging the first data and the second data in accordance with a rule.

2. The apparatus according to claim 1, wherein the allocating unit allocates the data to values of one of three primary colors of the color lookup table.

3. The apparatus according to claim 1, wherein the allocating unit allocates the data to values of at least two of three primary colors of the color lookup table.

4. The apparatus according to claim 1, wherein the allocating unit allocates the data while restricting an allocation object to only values of medium colors among values of three primary colors of the color lookup table.

5. The apparatus according to claim 1, which further comprises a table-adding unit for adding a new color lookup table to the color lookup table.

6. A digital watermarking apparatus for restoring a data embedded in an index color image data, comprising:
    a reading unit for reading out values of positions of a color lookup table included in the index color image data;
    a determining unit for determining whether the readout values are odd or even;
    a first restoring unit for restoring a first data from a value which is determined to be odd, and restoring a second data from a value which is determined to be even; and
    a second restoring unit for restoring the data with arranging the restored first and second data;
    wherein the second restoring unit rearranges an arrangement of the first data and the second data in accordance with a rule to restore the data.

7. The apparatus according to claim 6, wherein the reading unit reads out values of one of three primary colors of the color lookup table.

8. The apparatus according to claim 6, wherein the reading unit reads out values of at least two of three primary colors of the color lookup table.

9. A tangible computer-readable medium storing a set of instructions for embedding a data in an index color image data, wherein
    the data is configured by an arrangement of a first data and a second data, and
    the set of instructions comprises:
    allocating the data to values of positions of a color lookup table included in the index color image data;
    adjusting a value of the color lookup table to which the first data is allocated, to an odd number; and
    adjusting a value of the color lookup table to which the second data is allocated, to an even number;
    wherein said allocating the data is conducted after arranging the first data and the second data in accordance with a rule.

10. The computer-readable medium including the set of instructions according to claim 9, wherein
    the values of positions of a color lookup table are values of one of three primary colors of the color lookup table.

11. The computer-readable medium including the set of instructions according to claim 9, wherein
    the values of positions of a color lookup table are values of at least two of three primary colors of the color lookup table.

12. The computer-readable medium including the set of instructions according to claim 9, wherein
    the allocating the data is carried out while restricting an allocation object to only values of medium colors among values of three primary colors of the color lookup table.

13. The computer-readable medium including the set of instructions according to claim 9, wherein the set of instructions further comprises adding a new color lookup table to the color lookup table.

14. A tangible computer-readable medium storing a set of instructions for restoring a data embedded in an index color image data, the set of instructions comprising:
   reading out values of positions of a color lookup table included in the index color image data;
   determining whether the readout values are odd or even;
   restoring a first data from a value which is determined to be odd;
   restoring a second data from a value which is determined to be even; and
   restoring the data with arranging the restored first and second data;
   wherein the rearranging the restored first and second data is carried out by means of rearranging an arrangement of the first data and the second data in accordance with a rule to restore the data.

15. The computer-readable medium including a set of instructions according to claim 14, wherein the values of positions of a color lookup table included in the index color image data are values of one of three primary colors of the color lookup table.

16. The computer-readable medium including a set of instructions according to claim 14, wherein the values of positions of a color lookup table included in the index color image data are values of at least two of three primary colors of the color lookup table.

* * * * *